United States Patent
Haugabook

Patent Number: 5,209,345
Date of Patent: May 11, 1993

[54] COMBINATION STORAGE AND DISPLAY UNIT

[76] Inventor: Connie Haugabook, 616 Rawls St., Montezuma, Ga. 31063

[21] Appl. No.: 513,260

[22] Filed: Apr. 24, 1990

[51] Int. Cl.$^5$ .............................................. B65D 73/00
[52] U.S. Cl. .................... 206/45.13; 206/457; 206/1.5; 206/579; 220/335; 446/73
[58] Field of Search ............... 206/45.13, 45.15, 45.18, 206/457, 1.5, 822, 579; 220/335; 434/267, 276, 295, 297; 446/72, 73, 325, 368

[56] References Cited

U.S. PATENT DOCUMENTS

| | | | |
|---|---|---|---|
| 487,085 | 11/1892 | Buehl | 446/73 X |
| 1,300,710 | 4/1919 | Edwards | 220/335 X |
| 1,388,094 | 8/1921 | Buttigieg | 206/822 X |
| 3,741,379 | 6/1973 | Kappler et al. | 206/457 |
| 4,183,171 | 1/1980 | Terzian | 446/320 |
| 4,403,711 | 9/1983 | Kyosuke | 220/335 |
| 4,413,442 | 11/1983 | McSweeney | 446/73 |
| 4,795,033 | 1/1989 | Duffy | 206/457 |
| 4,964,831 | 10/1990 | Wolff | 446/73 X |

FOREIGN PATENT DOCUMENTS

| | | |
|---|---|---|
| 1409814 | 7/1965 | France . |
| 564361 | 7/1975 | Switzerland . |
| 2177611 | 1/1987 | United Kingdom . |

*Primary Examiner*—Jimmy G. Foster
*Assistant Examiner*—Jacob K. Ackun, Jr.
*Attorney, Agent, or Firm*—Jones & Askew

[57] ABSTRACT

A combination storage and display unit is disclosed wherein the unit can be used as a device for educating young children about the birthing process. The unit in its closed position resembles an egg. During this time the birthing process can be explained. After the birthing process is explained the unit can be placed in an open position and decorated to resemble a bassinet.

8 Claims, 3 Drawing Sheets

COMBINATION STORAGE AND DISPLAY UNIT

FIELD OF THE INVENTION

The present invention relates to a device for educating persons, particularly children, as to the birth process. More particularly, the present invention relates to a combination storage and display unit that can be used not only for storing and displaying any of a variety of items, but can further be used to educate people, particularly children, as to the birth process.

BACKGROUND OF THE INVENTION

Education is a matter of utmost importance. This is particularly so when educating people, particularly children, as to the process of birth. Many parents, teachers, ministers, counselors and others, are routinely faced with the difficult task of explaining to a young child "how" aa baby is made and "where" a baby comes from. For an infinite number of reasons, ranging from the complexity to the intimate nature of the subject matter, many find it difficult to explain to a young children "how a baby is made", "where the baby comes from" and, generally speaking, what the birthing process entails. The difficulty is perhaps best illustrated by the continuing debate over whether sex education is best done in the home or in the classroom. Regardless of one's opinion, the very fact that the debate rages on is reflective of the complex and sensitive nature of the issues and the intensity of the participant's opinions. The need is thus great for devices and methods that assist individuals in explaining the birthing process in a meaningful and tasteful manner.

A common tool for representing or depicting a baby is a doll. Dollmaking and presenting is an art to itself. More particularly, the provision of doll houses and intricate containers for storing a doll are well known. There are, of course, many other known containers that store a variety of items valuable to their owner. For example, jewelry boxes store jewels, toy chests store a multitude of toys and file cabinets store important papers and documents. Such containers are made in such a fashion that their main function is only to store items. They are not typically attractive if left open since you can see the contents of the container. Therefore, they are usually closed and perhaps locked. Usually the owners of the stored contents, i.e., the jewelry, toys or pills want these items to be hidden.

There are also, of course, many known devices which display a variety of items. For example, bookcases display books, and photos. Curio cabinets and other glass-enclosed cabinets display fine collectibles such as crystal, china, antique porcelain and silver. In the example of bookcases, books and items placed on the shelves are accessible and always in view. A bookcase does not protect books from dust or the elements. Curio cabinets, on the other hand, can protect items from dust and the elements, but the items placed in these cabinets are not accessible to the owner. These curio cabinet and other glass enclosed display cases are usually locked, thereby increasing the lack of access to its owner.

Accordingly, there is also a need in the art for a device which can function dually as a storage container and a display unit, and also allow an item being displayed to be accessible to its owner. Such a need is particularly great in the case of fine dolls. The collection of fine dolls is a long-standing practice of many who appreciate the workmanship and craft of the dollmaker. It is desirable to have a storage and display unit that protected the doll from the elements but also served to display the doll for viewing.

SUMMARY OF THE INVENTION

The present invention recognizes and fulfills both of the above, seemingly unrelated, needs in the prior art by providing a combination storage and display unit that can be used to educate persons as to the birthing process. The unit provides a cavity within which a doll may be stored or displayed. The unit is preferably configured as an egg to assist in the teaching of the birth process. When in the closed position, the storage and display unit appears as an unbroken egg. However, when in the display or open position, the container presents the doll (or other item) for viewing.

Generally described, the present invention comprises a combination storage and display unit including a top member, a bottom member and means for selectively maintaining the unit in a display position. A preferred embodiment of the invention further comprises a doll to be stored or displayed in the unit.

Described more particularly, the present invention comprises a combination storage and display unit including a top member, a matingly configured bottom member and means for securing the top member to the bottom member such that the top member may be pivoted about an axis to display an item contained in the unit. The top and bottom member are preferably configured to resemble an egg. The preferred item to be displayed and/or stored is a doll. The pivoting action of the top member relative to the bottom member simulates the birthing processes in that the doll contained or displayed is thus "hatched" by opening the egg-shaped unit to reveal the doll. In this manner, the present invention provides an educational tool whereby children and others can be given an initial understanding of the birthing process in a tasteful and dignified manner.

The present invention further includes means for selectively maintaining the unit in a display position. More particularly, the present invention includes a latch disposed on the bottom member for receipt by a retaining portion of the top member so as to maintain the unit in the display position. When the top and bottom members are placed in the display position, they are nested and latched into an open position such that the unit now resembles a baby's bassinet. Display of a doll in this configuration is thus particularly appropriate.

Thus, it is an object of the present invention to provide a storage unit.

It is a further object of the present invention to provide a display unit.

It is a further object of the present invention to provide a combination storage and display unit.

It is a further object of the present invention to provide a storage and display unit that when in a display position, the item being displayed is very accessible.

It is another object of the present invention to provide a storage and display unit that remains a unitary assembly when in the storage or display position.

It is another object of the present invention to provide a combination storage and display unit that simulates the birth process.

It is another object of the present invention to provide a combination storage and display unit that educates children and others as to basic concepts of the birth process in a tangible and tasteful manner.

It is another object of the present invention to provide a combination storage and display unit that, when closed, appears as an egg and, when open, appears as a bassinet.

It is another object of the present invention to provide a combination storage and display unit that may be selectively maintained in an open or display position.

These and other objects, features, and advantages of the present invention may be more clearly understood and appreciated from a review of the following detailed description of the disclosed embodiments and by reference to the appended claims and drawings.

BRIEF DESCRIPTION OF THE DRAWINGS

The invention will now be described with reference to the accompanying drawings, which illustrate preferred embodiments of the combination storage and display unit, falling within the scope of the appended claims and in which:

DETAILED DESCRIPTION OF THE INVENTION

Figure 1:
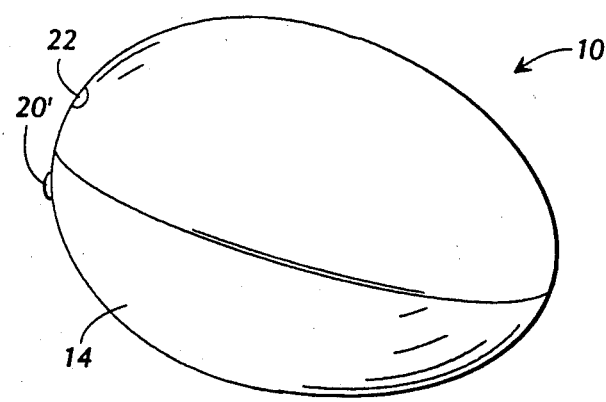
FIG. 1 is a perspective view of the storage and display unit in a closed position.
Figure 2:
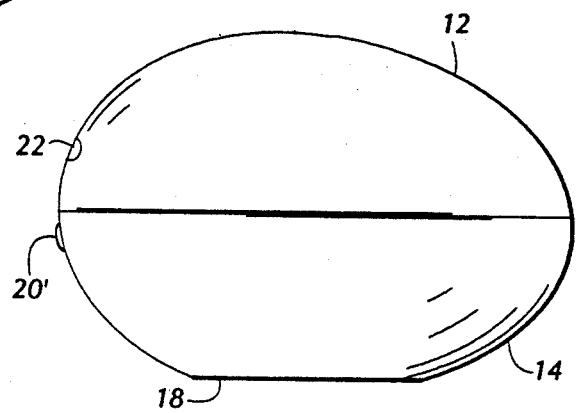
FIG. 2 is a side view of the preferred embodiment in a closed position.

Referring now in more detail to the drawing figures in which like numerals represent like parts throughout several views, FIGS. 1 and 2 illustrates a preferred embodiment of a combination storage and display unit 10 according to the present invention. The unit 10 is in the closed or storage position. The combination storage and display unit 10 includes a top member 12 and a bottom member 14. The top member 12 and the bottom member 14 are constructed for mating receipt such that, when placed in the closed position, a sealed storage container is formed. The details of the means for providing and insuring such a sealed container are given in greater detail hereinbelow. In the preferred embodiment, the storage and display unit 10 are oval shaped to thereby give the closed container an egg-like appearance. The top member 12 and the bottom member are preferably made of plastic, but any suitable material may be employed.

FIG. 2 also shows the combination storage and display unit, 10 in a closed position. The preferred bottom member 14 is formed with a flat bottom surface 18 that enables the storage and display unit 10 to sit on a flat surface without wobbling. One of ordinary skill in the art will appreciate that the bottom surface serves only to orientate and stabilize the unit 10. This being so, any of a variety of devices may be employed. For example, the combination display and storage unit 10 may be a true oval with no base or flat bottom surface, but employ detents or a stand to keep the unit erect and stable. As a further example, the unit 10 could be provided with legs that project from the surface of the bottom member 14. It is thus preferred that the combination storage and display unit 10, being oval in shape, be provided with means to stabilize the unit and keep it from rolling off a flat surface.

Both FIGS. 1 and 2 show a latch 20, a portion of which projects outwardly from the back side of the bottom member 14. This projecting portion is identified as element 20' in FIGS. 1 and 2. The top member 12 is provided with an aperture 22 that, as described in greater detail below, is aligned with the latch 20, preferably along a substantially vertical axis.

Figure 3:
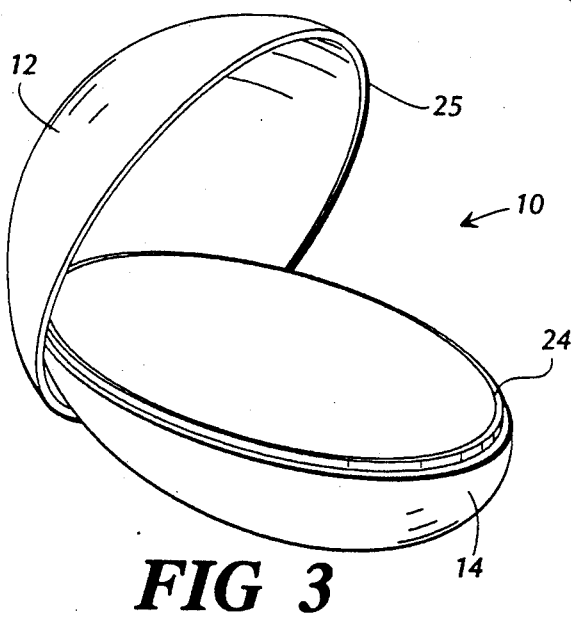
FIG. 3 is a perspective view of the preferred embodiment in an open position.
Figure 4:
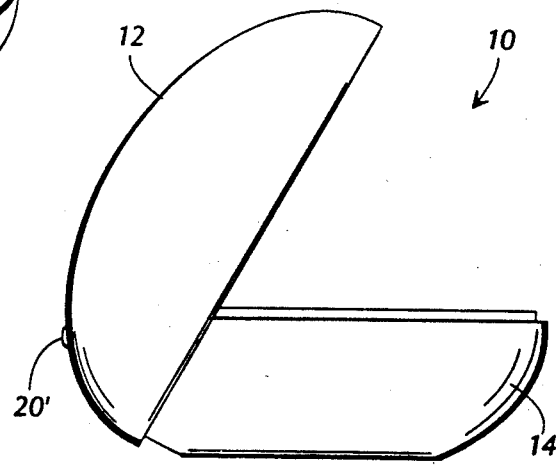
FIG. 4 is a side view of the preferred embodiment in an open position.

FIGS. 3 and 4 illustrate the preferred storage and display unit 10 in the open or display position. A shoulder 24 is formed around the periphery of the bottom member 14 to enable the bottom member to matingly receive the top member 12. More specifically, the shoulder 24 is positioned about the bottom member 14 such as to frictionally engage the lower peripheral portion 25 of the top member 12. Thus, when the top member 12 is placed over and pushed against the bottom member 14, the shoulder 24 forms a friction fit with the lower peripheral portion 25 of the top member 12 to in turn form a seal. To switch the unit 10 from the closed position illustrated in FIGS. 1 and 2 to the display position illustrated in FIGS. 3 and 4, one simply pulls or pivots the top member 12 from its frictional engagement with the bottom member 14.

It will be noted that, when the top member 12 is pivoted or pulled into the open or display position as illustrated in FIGS. 3 and 4, the top member and the bottom member 14 are nested in such a way as to give the unit 10 a bassinet-like appearance. This nesting is maintained by the latch 20 as described hereinbelow.

Figure 5A:
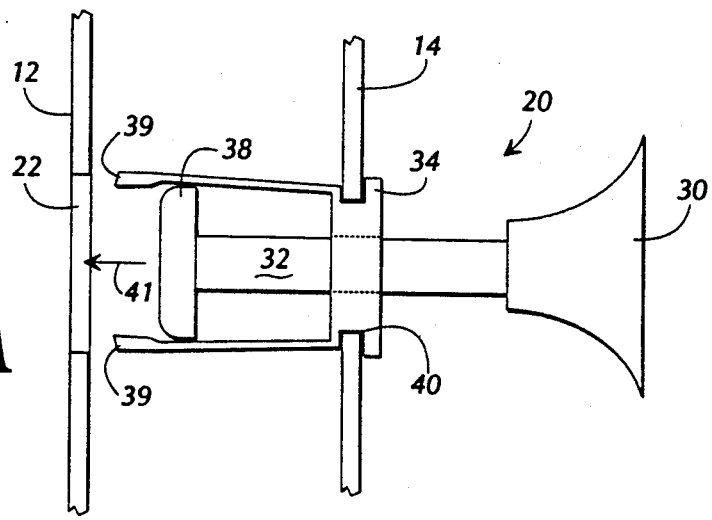
FIGS. 5A–5C are detailed views of the mechanism that maintains the unit in its open and closed positions.
Figure 5B:
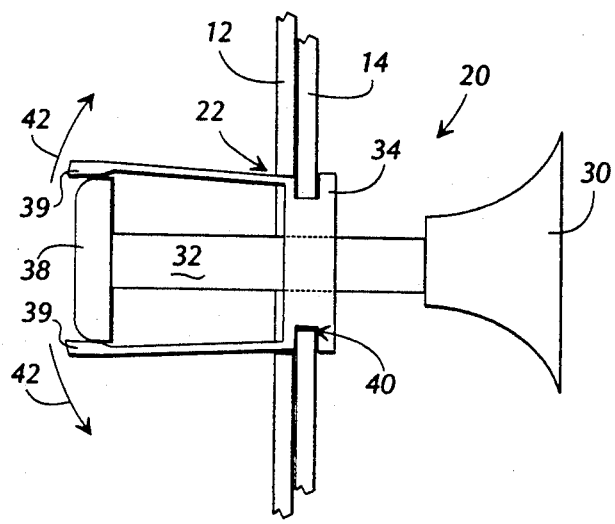
Figure 5C:
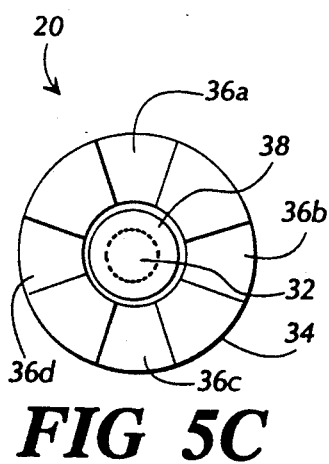

FIG. 5 illustrates a latching mechanism 20. The latching mechanism 20 is in the nature of a snap connector and serves to return the top member 12 to the bottom member 14 in the display or open position. The preferred latch consists of a stopper 30, a rod 32 formed integrally with the stopper, and a sleeve 34. The length of the sleeve 34 has a plurality of cuts 36a, 36b, 36c and 36d down its length. The rod 32 is fitted with an enlarged head 38 that, as described below, provides the snap connecting feature of the latch. The outer end of the sleeve 34 is indicated at 39. Thus, it will be understood that a portion of the sleeve 34 is retained on the inside of the wall of the bottom member 14, but that the sleeve extends through an aperture 40 in the bottom member wall to the exterior thereof. It will be further appreciated that the aperture 22 in the wall of the top member 12 is thus sized to receive and permit passage of the outer end of the sleeve 39. Once the outer end 39 of the sleeve 34 has been pushed through the aperture 22 in the top member 12, the stopper 30 is depressed, causing the rod 32 and enlarged head 38 to travel in the direction of the arrow 41 shown in FIG. 5A. This movement of the rod 32 brings the head 38 into contact with the interior of the sleeve 34, thereby acting on the outer end 39 of the sleeve by causing said outer end to move yieldingly outwardly from the rod 32 as indicated by the arrows 42 in FIG. 5B. Such movement of the end 39 of the sleeve 34 freezes the position of the top member 12, thereby retaining the top member in the open or display position. Such movement of the sleeve end 39 is facilitated by the cuts 36a-d in the outer end of the sleeve 34.

The combination display and storage unit 10 can be placed back into its storage or closed position by pulling back on the stopper 30. This action withdraws the rod 32, and more particularly the head 38, from operative engagement with the sleeve 34, causing the end 39 of the sleeve to return to its original diameter. The top member 12 and the bottom member 14 can then be separated by pulling the top member off of the sleeve by means of the aperture 22.

Figure 6:
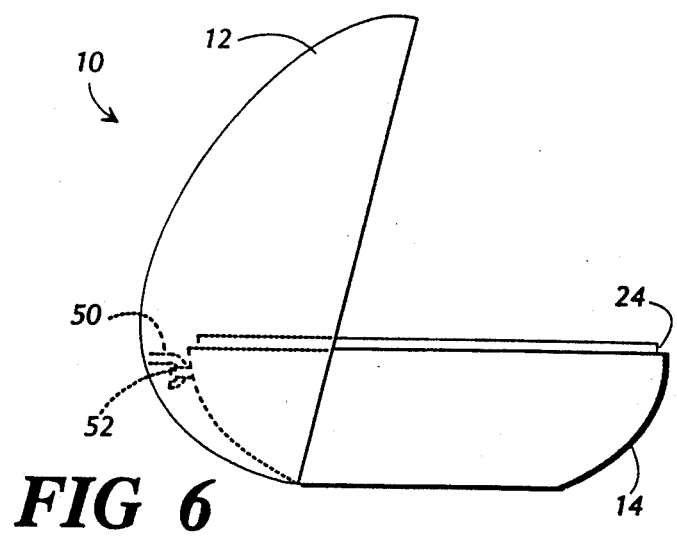
FIG. 6 is a side view of a first alternative embodiment that presents the invention in its closed position.

It is to be understood that there are many ways in which the combination storage and display unit 10 can be secured into an open position. FIG. 6 illustrates a unit 10 equipped with a hook 50 and eye 52 mounting mechanism. The hook element 50 is provided on the interior surface of the top member 12 and the eye element 52 is provided on the exterior surface of the bottom member 14. The cooperation between the hook 50 and eye 52 serves to secure the top member 12 in the open or display position.

Figure 7:
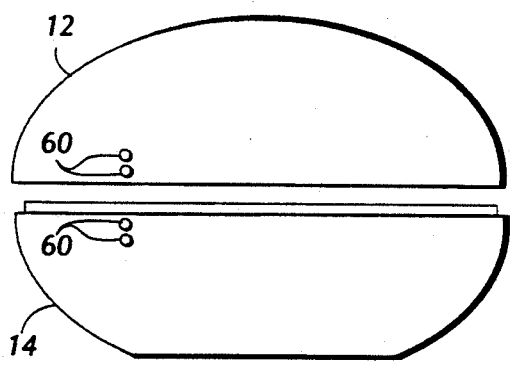
FIG. 7 is a side view of a second alternative embodiment of the present invention in a closed position.
Figure 8:
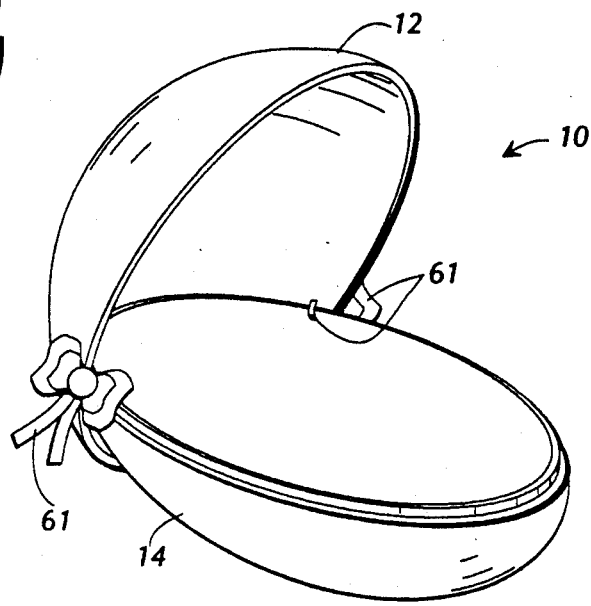
FIG. 8 is a perspective view of a third alternative embodiment of the present invention in an open position.

FIG. 7 illustrates yet another method of securing the unit 10 in the open or display position. A plurality of holes 60 are drilled into the top member 12 and bottom member 14 as demonstrated on FIG. 7. The members 12 and 14 are separated and nested so as to align the holes 60. A ribbon 61 is then laced through each one of the two sets of holes 60 and tied into a bow or other like decorative configuration. FIG. 8 illustrates the unit 10 in an open position using the above-described securing method.

Figure 9:
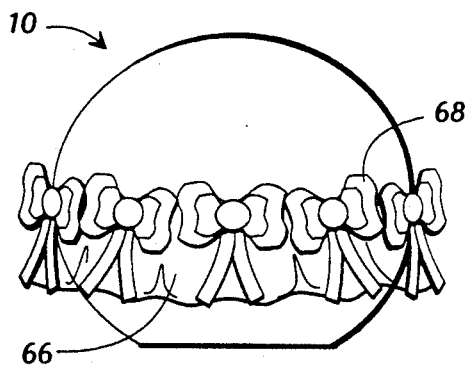
FIG. 9 is a side view of the third alternative embodiment of the present invention.
Figure 10:
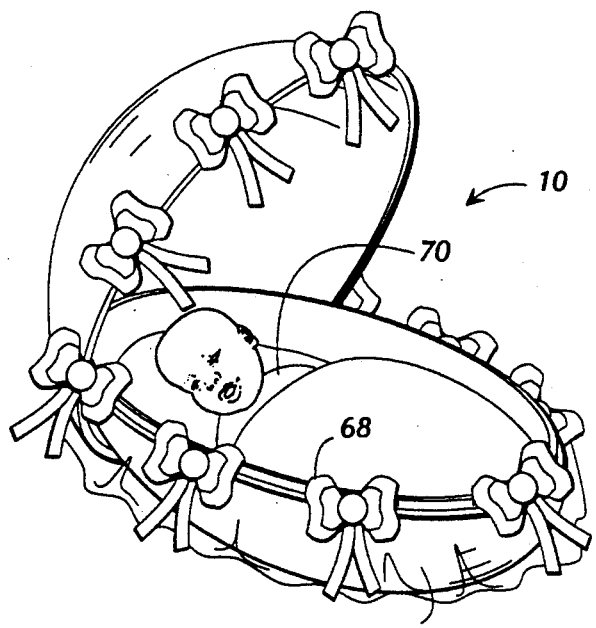
FIG. 10 is a perspective view of the third alternative embodiment of the present invention in an open position.

The storage and display unit 10 can be decorated any way the owner chooses. FIGS. 9 and 10 illustrate one way in which the unit 10 can be attractively decorated with lace 66 and bows 68. The panel of lace 66 is placed around the periphery of the unit 10 and a plurality of bows 68 are also placed around the periphery of the unit 10. This method of decoration allows the unit 10 to resemble a baby's bassinet in an open position.

The preferred embodiment of the present invention further includes a doll 70 sized to fit within the combination storage and display unit 10. Of course, other items may be provided such as stuffed animals or the like. It will be appreciated that the doll 70 or other item thus serves as a surrogate representative of a baby or animal to be born. The unit 10, in a closed position, takes the appearance of an egg. The doll 70 or animal is "born" by opening the egg (i.e., the combination storage and display unit) to reveal the doll 70 or animal. It is contemplated that written materials may be provided that explain the process in greater detail, thereby giving the parent or the like a guide by which to explain to a child or another basic concepts of the birth process.

The preferred embodiment of the present invention has been disclosed by way of example and it will be understood that other modifications may occur to those skilled in the art without departing from the scope and the spirit of the invention as embodied by the claims.

What is claimed is:

1. A storage and display unit comprising:
  a bottom member;
  a top member configured to close over a top of said bottom member so as to form a sealed storage container; and
  a latching mechanism disposed on said bottom member, for engaging and securing said top member to said bottom member when said top member is displaced relative to said bottom member to form a display unit, and whereby said latching mechanism engages and secures said top member to said bottom member such that said top member matingly receives said bottom member in a nesting relationship to form said display unit.

2. The storage and display unit of claim 1 wherein said top member and said bottom member are oval in shape, thereby providing an egg-like storage container when the unit is in a closed position and a bassinet-like display when the unit is in an open position.

3. The storage and display unit of claim 1 wherein said latching mechanism comprises a stopper operatively connected to a rod and a sleeve.

4. The storage and display unit of claim 1 wherein said latching mechanism for engaging said top member to said bottom member comprises a ribbon which is laced through a plurality of holes drilled at a point of intersection between said members and whereby said ribbon is tied securely in a knot to engage and secure said top member to said bottom member.

5. The storage and display unit of claim 1 wherein the latching mechanism comprises an eye formed on one end of said bottom member, said storage and display unit further comprising a hook formed on an interior of one end of said top member such that engagement and securement of said top member to said bottom member is facilitated by receipt of said hook into said eye.

6. A storage and display unit comprising:
  a top member;
  a bottom member a portion of said bottom member matingly configured to nest within a portion of said top member, and
  a stopper operatively connected to a rod and a sleeve that has cuts along the length of said sleeve said stopper, rod and sleeve operatively attached to said bottom member,
  whereby when said stopper is pushed in a first direction, said rod traverses the length of said sleeve and enlarges the diameter of said sleeve.

7. The storage and display unit of claim 6 further comprising an aperture in said top member, wherein said sleeve is sized to be imparted through said aperture such that enlargement of said sleeve secures said top member to said bottom member.

8. An educational device, comprising a combination storage and display unit comprising:
  an oval-shaped top member;
  an oval-shaped bottom member matingly configured for frictional receipt of said top member such that said top member and said bottom member appear as an egg; when said top member is closed over said bottom member and
  a stopper operatively connected to a rod and a sleeve disposed on said bottom member, whereby said top member can be displaced from said bottom member and disposed at substantially a right angle to said bottom member, and whereby said top member is secured to and matingly receives a portion of said bottom member when so displaced such that the device appears as a bassinet; and
  a doll for receipt by said bottom member,
  whereby said doll is placed within said combination storage and display unit to thereby simulate the birth of a child and provide a bassinet for simulation of caring for a child.

* * * * *